United States Patent
Faller et al.

(10) Patent No.: US 6,915,887 B2
(45) Date of Patent: Jul. 12, 2005

(54) DRIVE MEMBER FOR A WATER PUMP OF THE COOLING-WATER CIRCUIT OF AN INTERNAL COMBUSTION ENGINE AND FRICTIONAL SHIFT CLUTCH

(75) Inventors: Wolfgang Faller, Wakefield, MA (US); Andreas Wolf, Tettnang (DE)

(73) Assignee: Linning Trucktec GmbH, Markdorf (DE)

( * ) Notice: Subject to any disclaimer, the term of this patent is extended or adjusted under 35 U.S.C. 154(b) by 2 days.

(21) Appl. No.: 10/304,062

(22) Filed: Nov. 26, 2002

(65) Prior Publication Data

US 2003/0196863 A1 Oct. 23, 2003

(30) Foreign Application Priority Data

Nov. 30, 2001 (DE) .......................................... 101 58 732

(51) Int. Cl.⁷ .......................... F16D 27/12; F16D 27/01; F16D 27/112
(52) U.S. Cl. .................. 192/48.2; 192/48.3; 192/84.31; 192/90
(58) Field of Search ............................... 192/48.2, 48.3, 192/84.31, 84.961, 89.26, 90, 83, 83.31; 123/41.11, 41.12, 41.44, 41.47; 310/105; 417/223

(56) References Cited

U.S. PATENT DOCUMENTS

| | | | | |
|---|---|---|---|---|
| 3,723,029 A | * | 3/1973 | Laing ....................... | 123/41.12 |
| 4,397,380 A | * | 8/1983 | Yew ........................... | 192/90 |
| 4,926,992 A | * | 5/1990 | Linnig ....................... | 192/48.2 |
| 4,982,825 A | * | 1/1991 | Sekella ..................... | 192/90 |
| 5,586,636 A | * | 12/1996 | Linnig ....................... | 192/48.2 |
| 5,611,415 A | * | 3/1997 | Davis et al. .............. | 192/48.3 |
| 5,613,586 A | * | 3/1997 | Schilling et al. .......... | 192/48.3 |
| 5,636,719 A | * | 6/1997 | Davis et al. .............. | 192/48.2 |
| 6,007,303 A | * | 12/1999 | Schmidt .................... | 123/41.47 |
| 6,013,003 A | * | 1/2000 | Boffelli et al. ........... | 192/84.31 |
| 6,468,163 B1 | * | 10/2002 | Boffelli et al. ............. | 310/103 |
| 6,634,476 B2 | * | 10/2003 | Inoue et al. .............. | 192/48.2 |
| 2002/0012593 A1 | * | 1/2002 | Okuda ...................... | 417/223 |

FOREIGN PATENT DOCUMENTS

| | | |
|---|---|---|
| DE | 2318103 | 10/1974 |
| DE | 3203143 | 4/1983 |
| DE | 3504193 | 9/1985 |
| DE | 34 43 523 A1 * | 6/1986 |
| DE | 4121240 | 1/1993 |
| DE | 4207709 | 9/1993 |
| DE | 42 42 096 A1 * | 6/1994 |
| DE | 19701993 | 7/1998 |
| DE | 10013252 | 10/2001 |
| DE | 10018721 | 10/2001 |

* cited by examiner

Primary Examiner—Rodney H. Bonck
(74) Attorney, Agent, or Firm—McKenna Long & Aldridge LLP

(57) ABSTRACT

A drive member (1) for a water pump of the cooling-water circuit of an internal combustion engine, with a drive wheel (7) and a shaft (4) which is coupled to the water pump, is proposed. According to the invention, for the transmission of torque between the drive wheel (7) and the shaft (4), an electromagnetically actuable friction-disk clutch (9, 10, 11, 12) and a second clutch device in the form of an eddy-current clutch (14) are provided, the latter taking up the shaft (4) when the friction-disk clutch is out of engagement. Moreover, a frictional shift clutch for a drive member of this type is proposed.

7 Claims, 3 Drawing Sheets

Figure 1A:
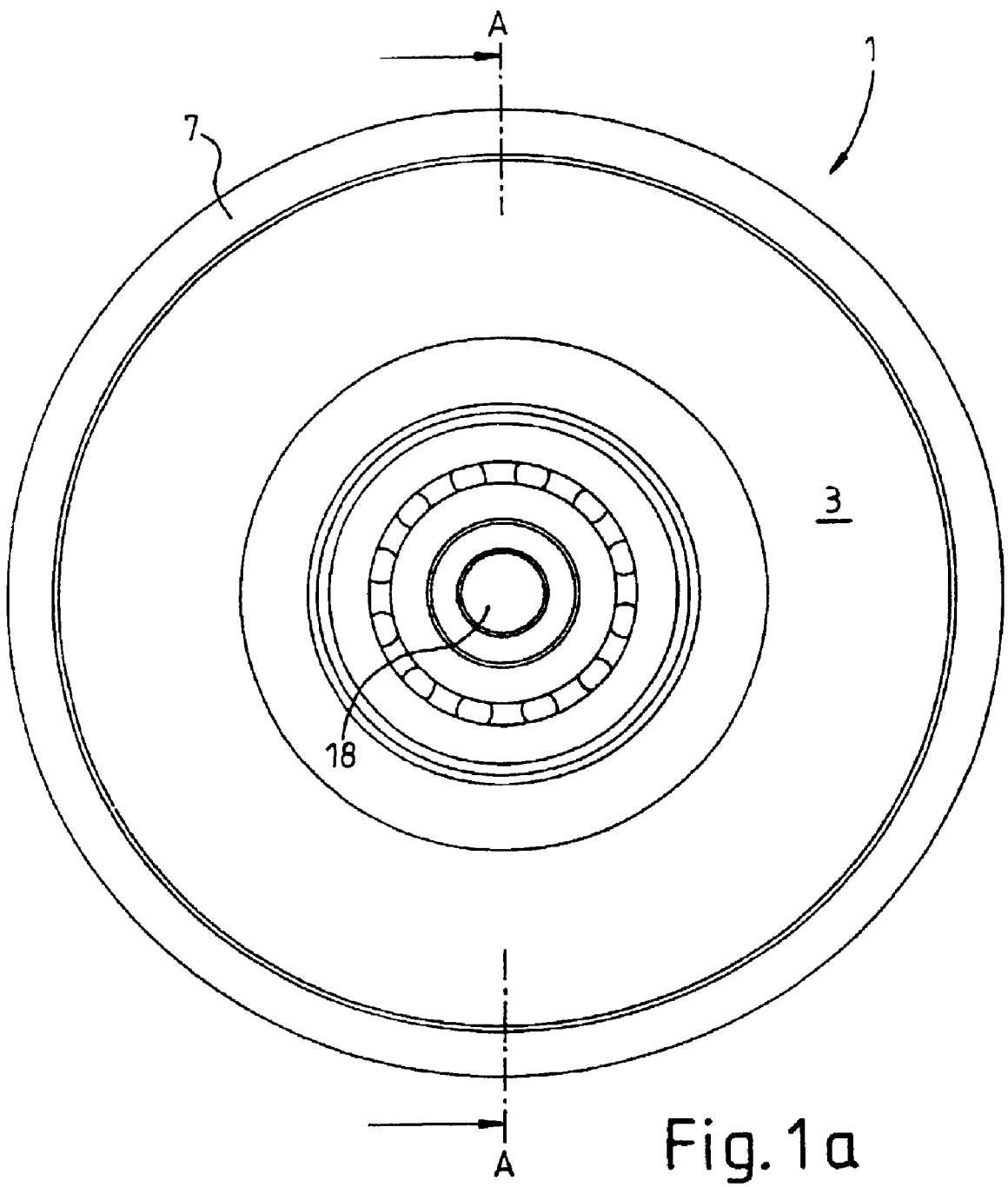

DRIVE MEMBER FOR A WATER PUMP OF THE COOLING-WATER CIRCUIT OF AN INTERNAL COMBUSTION ENGINE AND FRICTIONAL SHIFT CLUTCH

"Drive member for a water pump of the cooling-water circuit of an internal combustion engine and frictional shift clutch"

The invention relates to a drive member for a water pump of the cooling-water circuit of an internal combustion engine and to a frictional shift clutch.

PRIOR ART

Internal combustion engines regularly have a cooling-water circuit in order to maintain them at a favorable operating temperature. For effective heat transport, it is necessary for the water in the cooling circuit to be kept constantly in motion. For this purpose, generally, a water pump driven permanently by the engine is used, which ensures a constant circulation of the water in the cooling-water circuit.

However, the continuous corotation of the cooling-water pump when the internal combustion engine is in operation not only results in wear of the cooling-water pump, but also increases the fuel consumption of the internal combustion engine.

OBJECT AND ADVANTAGES OF THE INVENTION

The object on which the invention is based is to design the drive for a cooling-water pump in internal combustion engines more effectively.

This object is achieved by means of the features of present invention.

Advantageous and expedient developments of the invention are specified in the subclaims.

The invention proceeds from a drive member for a water pump of the cooling-water circuit of an internal combustion engine, with a drive wheel and a shaft which is coupled to the water pump. The essence of the invention is that, for the transmission of torque between the drive wheel and the shaft, an electromagnetically actuable friction-disk clutch and a second clutch device in the form of an eddy-current clutch are provided, the latter taking up the shaft when the friction-disk clutch is out of engagement. By virtue of this procedure, when the friction-disk clutch is "activated", the water pump is driven at a predetermined engine rotational speed, as is known from the prior art. However, it is also possible, with the friction-disk clutch disengaged, to operate the water pump at a substantially lower take-up rotational speed. As compared with a permanent cut-in of the water pump at a predetermined engine rotational speed, the lower take-up rotational speed has the advantage not only that it undergoes a lower degree of wear, but that fuel can also be saved. The invention makes use, in this context, of the knowledge that the cooling-water requirement of a cooling-water system of an internal combustion engine, for example in a vehicle, necessitates a maximum rotational speed of the cooling-water pump for only approximately 50% of the operating time. In colder climatic zones, this percentage is even markedly lower. In the remaining operating time of the vehicle, it is not necessary for the water pump to have a "100% rotational speed" (in relation to the rotational speed of, for example, a V-belt pulley driving the water pump). A substantially lower rotational speed is fully sufficient. However, a complete cut-off of the water pump is not permitted, since heat nests may otherwise occur in the engine cooling circuit. A forced circulation of the cooling water, necessary because of this, is implemented, when the friction-disk clutch is "deactivated", by means of the eddy-current clutch.

In order to acquire particularly effective magnetic coupling of the electromagnetically actuated friction-disk clutch, it is proposed that the drive wheel have an annular disk portion, there being arranged, on one side of the white [sic] portion, a stationary electromagnet of the friction-disk clutch and, on the opposite side of the disk portion, an armature disk which is mounted so as to be axially displaceable and via which the drive wheel and the shaft can be connected nonpositively.

In a particularly preferred refinement of the invention, the armature disk is arranged on a rotor which is concentric to the drive wheel and which is connected fixedly in terms of rotation to the shaft, the armature disk being separated from the annular disk portion by spring means when the electromagnet is in the currentless state. By contrast, when current is applied to the electromagnet, the armature disk comes to bear on the disk portion counter to the force of the spring means, with the result that the shaft and the drive wheel are connected nonpositively. This is a mode of operation in which, by current being applied to the electromagnet, the water pump runs at the same rotational speed as the drive wheel, to be precise the "100% rotational speed" indicated above.

In an alternative embodiment, the armature disk is arranged on the drive wheel and, when the electromagnet is in the currentless state, is pressed by spring means onto the rotor which is connected fixedly in terms of rotation to the shaft, with the result that there is a nonpositive connection between the drive wheel and the shaft. By contrast, in the state in which current is applied, the armature disk is separated from the rotor by the magnetic flux of the electromagnet. The advantage of this is that, when the electromagnet is cut off, for example due to a fault in the supply of electrical current to the electromagnet, the cooling-water pump is always cut in at its maximum rotational speed. What may be referred to as a "fail-safe clutch" is thus implemented.

In a particularly preferred refinement of the invention, the rotor, which is connected fixedly in terms of rotation to the shaft, may be designed as a fan wheel. Air cooling for the dissipation of lost heat from the eddy-current clutch when the friction-disk clutch is deactivated is consequently implemented.

In a particularly preferred refinement of the invention, the drive wheel is designed as a V-belt pulley, the friction-disk clutch and the eddy-current clutch lying axially in the region of the width of the V-belt pulley. Advantageously, the clutch components are arranged within the width of the V-belt pulley. Preferably, the eddy-current clutch is formed concentrically to the friction-disk clutch, an air gap of the eddy-current clutch and the armature disk of the friction-disk clutch lying approximately in one plane. By virtue of this procedure, it is possible to have a particularly compact construction of the entire clutch arrangement between the drive wheel and the shaft. Easy integration of the clutch arrangement into existing systems can therefore take place, without major structural changes being necessary. In particular, as a result of the positioning of the friction-disk clutch and the eddy-current clutch, the clutch arrangement can be incorporated into systems, without, for example, the diameter of a V-belt pulley or the belt gage having to be modified. Moreover, due to the clutch portions being positioned concentrically and in one plane, there is no need for any additional axial space.

Furthermore, the compact form of construction is also assisted in that the drive wheel, for example a V-belt pulley, is mounted rotatably by means of a hollow shaft above the shaft for the water pump.

The space-saving geometric arrangement of the friction-disk and eddy-current clutches in terms of the drive wheel, for example a V-belt pulley, may also be used advantageously as a compact structural solution for the transmission of torque between a drive wheel and another rotating internal combustion engine part to be driven.

DRAWINGS

Figure 1B:
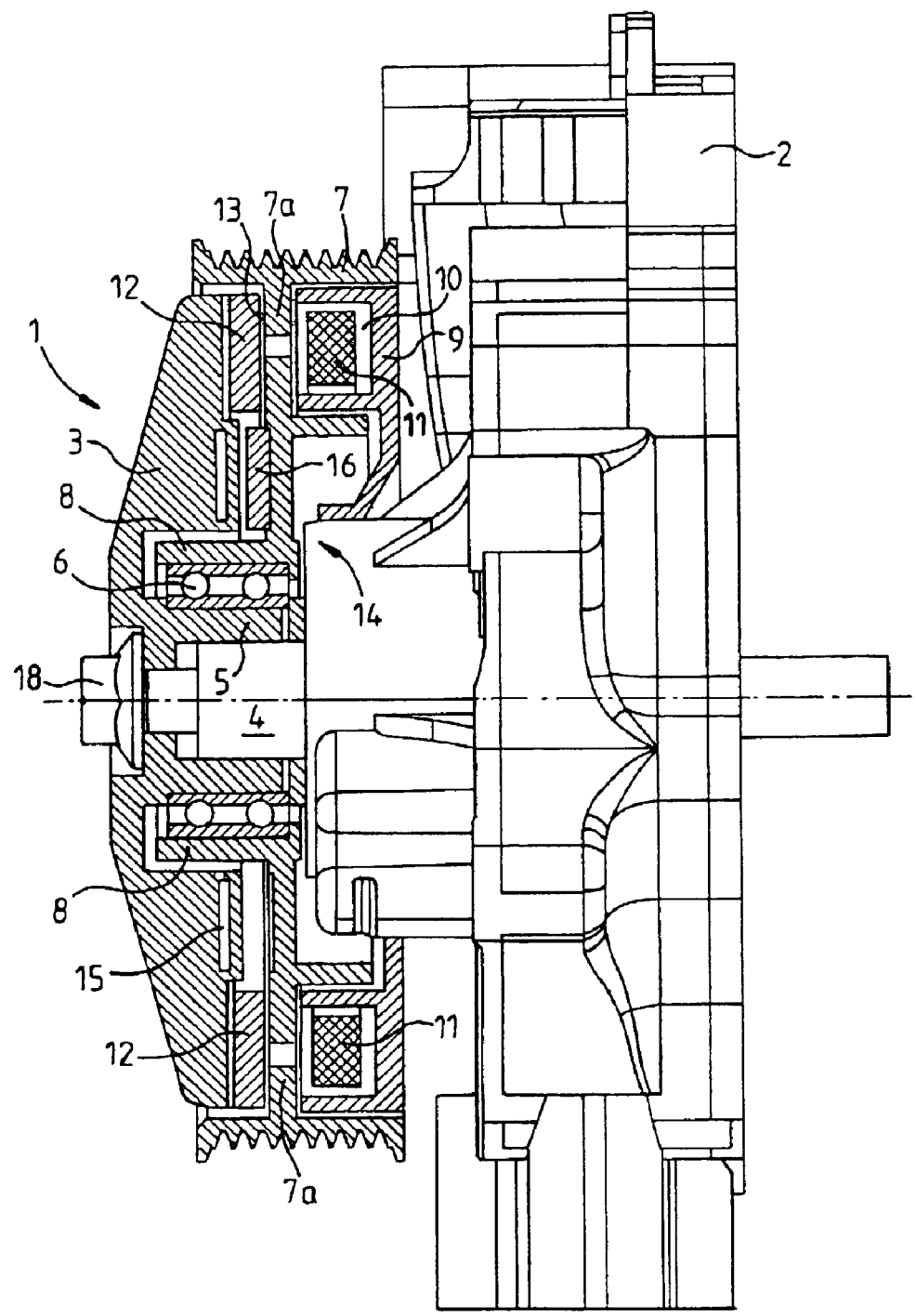
Figure 2:
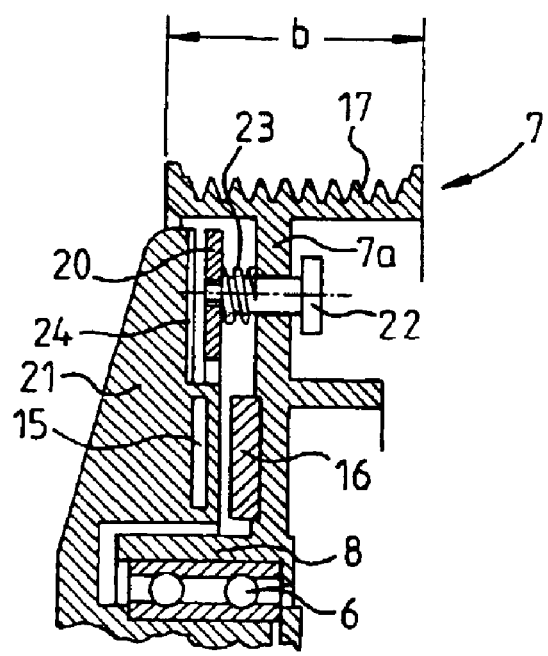

Two exemplary embodiments of the invention are illustrated in the drawings and are explained in more detail, with further advantages and particulars being given. In the drawings:

FIG. 1a shows a top view of a V-belt pulley with a fan wheel on a water-pump drive shaft, FIG. 1b shows the V-belt pulley with fan wheel according to FIG. 1a, in a sectional view along the sectional line A—A, arranged on an engine block portion not shown in section, and FIG. 2 shows a sectional part view of an alternative embodiment of a friction-disk clutch between a V-belt pulley and a fan wheel.

DESCRIPTION OF THE EXEMPLARY EMBODIMENTS

The drive member 1 for a water pump (not illustrated) of the cooling-water circuit of an internal combustion engine comprises a fan wheel 3 (made, for example, of aluminum), which is connected fixedly in terms of rotation, here, for example, via a screw 18, to a drive shaft 4 of the cooling-water pump. A V-belt pulley 7 is rotatably mounted by means of a ball bearing 6, via a hollow shaft 8, on a sleeve 5 of the fan wheel 3, into which sleeve the front region of the drive shaft 4 is pushed.

Positioned fixedly on a pump casing 2 of the engine block is an annular stator 9, in the annular slot 10 of which is arranged a likewise fixed electromagnet 11. The line routing to the electromagnet 11 is not illustrated.

In the region of the electromagnet 11, the V-belt pulley is designed as an annular disk portion 7a. On that side of the disk portion which is located opposite the electromagnet 11, an annular armature disk 12 is positioned on the fan wheel 3.

In the event that current is not applied to the electromagnet 11, the annular armature disk 12 is pulled via spring means (not illustrated) onto the fan wheel 3 along guide elements (not illustrated) running parallel to the drive shaft 4, so that there is an air gap 13 between the annular disk portion 7a of the V-belt pulley 7 and the annular armature disk 12.

The result of this is that a rotation of the V-belt pulley 7 is not transmitted directly to the fan wheel 3 and therefore to the cooling-water pump.

In this case, the eddy-current clutch 14 formed radially within the annular armature disk 12 comes into action.

The latter comprises an annular steel disk 15 cast into the fan wheel 3 made of aluminum and permanent magnets 16 arranged annularly on the V-belt pulley 7. The permanent magnets 16 are at a slight distance from the fan wheel 3 in the axial direction, so that the fan wheel can rotate contactlessly with respect to the permanent magnets. In the event of a relative movement of the permanent magnets 16 in relation to the annular steel disk 15 in the fan wheel 3, eddy currents are induced in the annular steel disk 15 which result in a magnetic field counteracting the permanent-magnetic cause. This affords a contactless transmission of torque from the V-belt pulley 7 to the fan wheel 3 and consequently, via the drive shaft 4, to the cooling-water pump.

According to the eddy-current principle, the fan wheel 3 rotates at a markedly lower "take-up rotational speed", as compared with the V-belt pulley 7. This is sufficient, however, to operate the cooling-water pump in such a way that a basic circulation which is fully sufficient in many cases is maintained in the cooling-water circuit.

Insofar as a higher rotational speed of the cooling-water pump is required, current is applied to the electromagnet 11, with the result that the annular armature disk is pulled onto the annular disk portion 7a by the magnetic flux in the stator, in the annular disk portion 7a and in the annular armature disk 12, until the annular armature disk 12 comes to bear completely on the V-belt pulley 7 and assumes the rotational speed of the latter. In this state, the cooling-water pump is connected nonpositively to the surface of the annular disk portion 7a and consequently to the V-belt pulley 7 via the friction face of the annular armature disk 12.

FIG. 2 illustrates an alternative possibility for the arrangement of an annular armature disk. All the other elements correspond to the embodiment according to FIGS. 1a and 1b and are therefore given the same reference symbols.

The different arrangement of an annular armature disk 20 results in a somewhat different version of the aluminum fan wheel which therefore acquires a specific reference symbol 21.

In this embodiment, the annular armature disk is arranged, for example via a screw or rivet connection 22, on the annular disk portion 7a of the V-belt pulley 7, in such a way that the latter, although being positioned fixedly in terms of rotation, can move in the axial direction of the screw or rivet connection 22. Between the annular disk portion 7a and the armature disk 20 is arranged a compression spring 23 which presses the armature disk 20 against a wear-resistant friction coating 24 on the fan wheel 21 when the electromagnet 11 is in the currentless state. As a result, with the electromagnet 11 in the currentless state, the V-belt pulley 7 is nonpositively connected, via the friction coating 24, to the fan wheel 21 and consequently, via the drive shaft 4, to the cooling-water pump.

When current is applied to the electromagnet 11, a magnetic field is formed in the stator 9, the annular disk portion 7a and the annular armature disk 20. Since magnetic field lines have the property of wanting to become shorter, this leads to a force effect which pulls the armature disk onto the annular disk portion 7a of the V-belt pulley 7 counter to the compression spring 23. The nonpositive connection between the annular armature disk 20 and the friction face 24 of the aluminum fan wheel 21 is consequently released. The transmission of a torque from the V-belt pulley 7 then takes place, as already stated above, with a corresponding action between the permanent magnets 16 and the cast-in steel disk 8 in the aluminum fan wheel 21.

The embodiment according to FIG. 2 has the advantage of forming what may be referred to as a "fail-safe clutch". That is to say, a cut-off of the electromagnet 11, for example due to a fault in the electric supply of the electromagnet 11, always leads to the cut-in of the cooling-water pump at the maximum possible rotational speed, which may be important for reasons of reliability.

In both embodiments according to FIGS. 1a, b and FIG. 2, the clutch elements are arranged in such a way that they do not exceed the width b of an annular V-belt support 17 in the axial direction. This is achieved in that the friction-disk clutch and the eddy-current clutch 14 are not only arranged concentrically, but also in such a way that the annular armature disk 12, 20 lies approximately in one plane with the air gap of the eddy-current clutch 14.

This is important so that the frictional shift clutch can easily be incorporated between the V-belt pulley 7 and fan wheel 3, 21 into existing concepts in which, for example, a V-belt pulley is connected fixedly to a drive shaft of a cooling-water pump.

List of Reference Symbols:
1 Drive member
2 Pump casing of the engine block
3 Fan wheel
4 Drive shaft
5 Sleeve
6 Ball bearing
7 V-belt pulley
7a Annular disk portion
8 Hollow shaft
9 Stator
10 Slot
11 Electromagnet
12 Annular armature disk
13 Air gap
14 Eddy-current clutch
15 Annular steel disk
16 Permanent magnet
17 Annular V-belt supports
18 Screw
20 Annular armature disk
21 Fan wheel
22 Screw or rivet connection
23 Compression spring
24 Friction coating

What is claimed is:

1. Drive member (1) for a water pump of the cooling-water circuit of an internal combustion engine, with a drive wheel (7) and a shaft (4) which is coupled to the water pump, characterized in that, for the transmission of torque between the drive wheel (7) and the shaft (4), an electromagnetically actuable friction-disk clutch (9, 10, 11, 12) and a second clutch device in the form of an eddy-current clutch (14) are provided, the latter taking up the shaft (4) when the friction-disk clutch (9, 10, 11, 12) is out of engagement, and wherein the drive wheel is designed as a V-belt pulley (7), the friction-disk clutch (9, 10, 11, 12) and the eddy-current clutch (14) lying axially in the region of the width (b) of the V-belt pulley (7).

2. Drive member according to claim 1, characterized in that the drive wheel (7) has an annular-disk portion (7a), there being arranged, on one side of the disk portion (7a), a stationary electromagnet (11) of the friction-disk clutch and, on the opposite side of the disk portion (7a), an armature disk (12, 20) which is mounted so as to be axially displaceable and via which the drive wheel (7) and the shaft (4) can be connected nonpositively.

3. Drive member according to claim 2, characterized in that the armature disk (12) is arranged on a rotor (3) which is concentric to the drive wheel (7) and which is connected fixedly in terms of rotation to the shaft (4), and in that, when the electromagnet (11) is in the currentless state, the armature disk (12) is separated from the annular disk portion (7a) by spring means, but, when current is applied to the electromagnet (11), comes to bear on the disk portion (7a) counter to the force of the spring means, with the result that the shaft (4) and the drive wheel (7) are connected nonpositively.

4. Drive member according to claim 2, characterized in that the armature disk (20) is arranged on the drive wheel (7), and in that, when the electromagnet (11) is in the currentless state, the armature disk (20) presses by spring means (23) onto the rotor (21) which is connected fixedly in terms of rotation to the shaft (4) and which thus connects the drive wheel (7) nonpositively to the shaft (4), whereas, in the state in which current is applied, the armature disk (20) is separated from the rotor (21) by the magnetic flux of the electromagnet (11).

5. Drive member according to claim 1, further comprising a rotor designed as a fan wheel (3, 21) arranged on the shaft.

6. Drive member according to claim 1, characterized in that the drive wheel (7) is coupled to the shaft (4) by means of a hollow shaft (8).

7. Frictional shift clutch for an internal combustion engine for the transmission of torque between a drive wheel (7) and a rotating part (3, 21) to be driven, with a friction-disk clutch and with a second clutch device in the form of an eddy-current clutch (14) which takes up the part (3, 21) to be driven when the friction-disk clutch is out of engagement, characterized in that the friction-disk clutch and the eddy-current clutch (14) are positioned concentrically to the axis of rotation of the drive wheel (7), and in that the drive wheel is designed as a V-belt pulley (7), the friction-disk clutch and the eddy-current clutch (14) lying axially in the region of the width (b) of a drive ring (17) of the V-belt pulley (7).

* * * * *